United States Patent [19]

Johnson et al.

[11] Patent Number: 5,289,476
[45] Date of Patent: Feb. 22, 1994

[54] TRANSMISSION MODE DETECTION IN A MODULATED COMMUNICATION SYSTEM

[75] Inventors: Howard W. Johnson, Sunnyvale; Chin-Chen Lee, San Jose; Amy O. Hurlbut, San Francisco, all of Calif.

[73] Assignee: Echelon Corporation, Palo Alto, Calif.

[21] Appl. No.: 698,445

[22] Filed: May 10, 1991

[51] Int. Cl.5 .................... C06F 11/10; H04L 27/20; H03D 3/22
[52] U.S. Cl. .................................. 371/37.1; 375/67; 375/83
[58] Field of Search ............. 371/37.1, 37.2, 37.7, 371/42, 6; 375/67, 97, 113, 114, 52, 53

[56] References Cited

U.S. PATENT DOCUMENTS

| | | | |
|---|---|---|---|
| 4,843,352 | 6/1989 | Kamisaka et al. | 332/22 |
| 4,972,417 | 11/1990 | Sako et al. | 371/37.4 |
| 5,070,503 | 12/1991 | Shikakura | 371/37.1 |
| 5,159,452 | 10/1992 | Kinoshita et al. | 358/141 |
| 5,179,360 | 1/1993 | Suzuki | 332/103 |
| 5,195,098 | 3/1993 | Johnson et al. | 371/37.2 |
| 5,210,518 | 5/1993 | Graham et al. | 340/310 R |
| 5,210,770 | 5/1993 | Rice | 375/1 |
| 5,228,041 | 7/1993 | Yoshiro et al. | 371/47.1 |

Primary Examiner—Charles E. Atkinson
Assistant Examiner—Joseph E. Palys
Attorney, Agent, or Firm—Blakely Sokoloff Taylor & Zafman

[57] ABSTRACT

A power line communication (PLC) apparatus wherein transmission mode information is encoded into each data packet while maintaining immunity from single bit errors. In the present invention, a power line communication system includes a transmitter/receiver (i.e. transceiver) which is coupled to a power distribution network. Data is transmitted through the power line by the transceiver in packets. The transceiver includes a preamble generator which creates a preamble for each of the data packets and a preamble decoder that decodes the preamble of a data packet and determines word sync for the packet. The preamble generated by the preamble generator consists of a carrier detect interval, a carrier sync interval, a bit sync interval, and a word sync pattern. The transceiver may select either BPSK or QPSK transmission modes on a data packet by data packet basis by encoding information into the packet preamble. Transmission mode information is encoded into the preamble using one of two seven-bit cross compatible word sync patterns for each data packet. Thus, one word sync pattern is used to define a BPSK transmission while the other word sync pattern is used to define a QPSK transmission. The transmitter may send data packets using either BPSK or QPSK on a packet by packet basis by generating the appropriate word sync pattern for each packet. The receiver uses the word sync pattern to determine the receive mode for each packet.

20 Claims, 6 Drawing Sheets

DETECTING WORDSYNC PATTERN

FIGURE 5

CROSS COMPATIBILITY OF WORDSYNC PATTERNS

TRANSMISSION MODE DETECTION IN A MODULATED COMMUNICATION SYSTEM

FIELD OF THE INVENTION

The present invention relates to electronic communication systems. Specifically, the present invention relates to modulated data communication systems.

BACKGROUND OF THE INVENTION

Prior art data communications systems use a variety of methods for coding data into an analog medium. Such well known methods include amplitude modulation, frequency modulation and phase modulation. Two forms of phase modulation are commonly used: BPSK (Binary Phase Shift Keyed) and QPSK (Quadrature Phase Shift Keyed). In a BPSK system, there are two phases: an in-phase signal and a 180° out of phase signal. During each baud (i.e. digital symbol transmission cycle), the transmitter sends one of the two signals. The phase sent determines the value of the bit transmitted (zero or one). A single binary bit per baud is conveyed from transmitter to receiver during each baud time in a BPSK system.

In a QPSK system, there are four phases: an in-phase signal, a 180° out of phase signal, a +90° phase signal, and a −90° phase signal. During each baud, the transmitter sends one of four baud signals. The phase sent determines the value of each of two transmitter bits. Two binary bits per baud are thus conveyed from transmitter to receiver during each baud time.

Both BPSK and QPSK systems have a distinct set of characteristics that make one form of coding better in some circumstances while the other method is better for other situations. QPSK has the advantage of getting more data into less bandwidth. At the same time, separation between phases in a QPSK system is half that of BPSK phases (phases are only 90 degrees apart in QPSK instead of 180 degrees for BPSK). Thus, some noise immunity is lost in QPSK. If there is any kind of impairment on a communication channel which could modulate the phase of the carrier, BPSK would be more reliable than QPSK. Therefore, QPSK is more efficient in getting more data into a limited bandwidth while BPSK is more robust.

BPSK and QPSK phase modulation techniques may be employed in a variety of adverse communication environments. One such adverse environment is a power distribution network. Although a power line may be used as a data communication medium, the level of noise present on the power line makes effective communication very difficult. A typical AC power line network is used for power distribution to a number of electric devices connected thereto. Such devices cover a wide range of applications including hair dryers, television sets, computers and specialized factory tooling. Each type of device conducts a significant level of noise back onto the power lines. Different devices produce a different type and degree of noise. This diverse power line noise problem severely impairs the efficient and reliable operation of any power line communication system.

Another problem hindering any power line communication system is signal attenuation. Due in part to the diverse impedance levels of the electric devices being used with a power line network, transmitted communication signals may suffer greater than 40 dB attenuation before being captured by a receiver. The significant signal attenuation problem in combination with the noise problem renders effective signal line communication difficult.

Time varying conditions on a typical AC power line have been observed to cause sudden, periodic shifts in the carrier phase of received data communication signals. Phase shifts up to 45 degrees in the carrier frequency range of 50 KHz to 150 KHz are relatively common. In the carrier frequency range of 100 KHz to 150 KHz, a phase modulation of 22 degrees is relatively common, while 45 degree shifts occur only when certain electrical devices are powered on. These phase shifts severely impair the capability of any QPSK receiver during the time the interference is present. At other times, for example when certain electrical devices which produce large phase variation are powered off, power line interference is reduced to a level at which QPSK operation is not a reliability risk. It will be apparent to those skilled in the art that other adverse data communication environments other than power line distribution networks present impairments to the faster QPSK method.

It is therefore desirable to support both BPSK (for robustness) and QPSK (for speed) modes in a single data communication system. The QPSK mode can be enabled when low levels of interference allow fast transmission; BPSK mode may be enabled when greater reliability is necessary in a noisy environment. It is also desirable to provide a means for switching between BPSK and QPSK modes that is tolerant of bit errors occurring during transmission of the mode information.

SUMMARY OF THE INVENTION

A power line communication (PLC) apparatus is described wherein transmission mode information is encoded into each data packet while maintaining immunity from single bit errors. In the present invention, a power line communication system includes a circuit breaker panel to which a plurality of power lines are coupled. Electrical outlets may also be connected to the power lines. This power distribution network may be used as communications medium as well as a power distribution means. Thus, data may be transferred from one location on the power distribution network to another location via the power lines. In order to provide the data communications capability, the present invention includes a transmitter/receiver (i.e. transceiver) which is coupled to the power distribution network.

Data is transmitted through the power line by the transceiver in packets. The transceiver of the present invention includes a preamble generator which creates a preamble for each of the data packets and a preamble decoder that decodes the preamble of a data packet and determines word sync for the packet. The preamble is positioned by the preamble generator in front of the packets of encoded data prior to transmission. The preamble generated by the preamble generator consists of a carrier detect interval, a carrier sync interval, a bit sync interval, and a word sync pattern. The carrier detect interval of the preamble is used by the receiver to identify the beginning of a data packet. The carrier sync interval of the preamble is used by a carrier synchronization circuit to identify the phase of the incoming transmission. The bit sync section of the preamble is used by a bit (baud) synchronization circuit to indicate the positions of baud symbols within the packet. The word sync pattern in the preamble is used by the preamble decoder to identify the beginning of a baud grouping, called a forward error correcting word (i.e. FEC word). The remainder of the data packet is transmitted and received as a collection of FEC words. The transceiver of the present invention may select either BPSK (Binary Phase Shift Keyed) or QPSK (Quadrature Phase Shift Keyed) transmission modes on a data packet by data packet basis by encoding information into the packet preamble. The transceiver always begins transmitting each packet in the BPSK mode. At a fixed position in the preamble of every packet, after carrier synchronization (if used) and after bit synchronization are complete, the transmitter sends a fixed code (i.e. a transmission mode) indicating to the receiver whether the remainder of the packet will be decoded as BPSK or QPSK data. After decoding the transmission mode in the preamble, the receiver switches to BPSK or QPSK mode accordingly.

In the present invention, the transmission mode information is encoded into the word sync pattern itself in a way which consumes fewer bits than if word sync and transmission mode were coded separately. If a transmission mode is transmitted separately from the word sync pattern, a transmission mode requires at least three transmitted bits to encode one bit of mode information, assuming that at least single bit error detection is implemented. Using the present invention, however, only a single additional preamble bit is necessary to encode mode information while maintaining single bit error detection.

Transmission mode information is encoded into the preamble using one of two seven-bit cross compatible word sync patterns for each data packet. Thus, one word sync pattern is used to define a BPSK transmission while the other word sync pattern is used to define a QPSK transmission. The appropriate word sync pattern (associated with either BPSK or QPSK) is generated for each data packet by the preamble generator. The transmitter may send data packets using either BPSK or QPSK on a packet by packet basis by generating the appropriate word sync pattern for each packet. The receiver uses the word sync pattern to determine the receive mode for each packet.

It is therefore an object of the present invention to implement a data communication system capable of reliably transmitting and receiving information despite the presence of interference on the communication medium. It is a further object of the present invention to implement a data communication system that supports both BPSK and QPSK modes of operation in a single system. It is a further object of the present invention to implement a data communication system that allows switching between BPSK and QPSK modes on a data packet by data packet basis. It is a further object of the present invention to implement a data communication system that provides a means for switching between BPSK and QPSK modes that is tolerant of bit errors occurring during transmission of the mode information.

These and other objects of the present invention will become apparent as presented and described in the following detailed description of the preferred embodiment.

DETAILED DESCRIPTION OF THE PREFERRED EMBODIMENT

A power line communication (PLC) apparatus is described wherein transmission mode information is encoded into each data packet while maintaining immunity from single bit errors. In the following description, numerous specific details are set forth in order to provide a thorough understanding of the invention. However, it will be apparent to one skilled in the art that these specific details need not be used to practice the present invention. In other instances, well-known structures, circuits, frequencies, and interfaces have not been shown in detail in order not to unnecessarily obscure the present invention.

Figure 1:
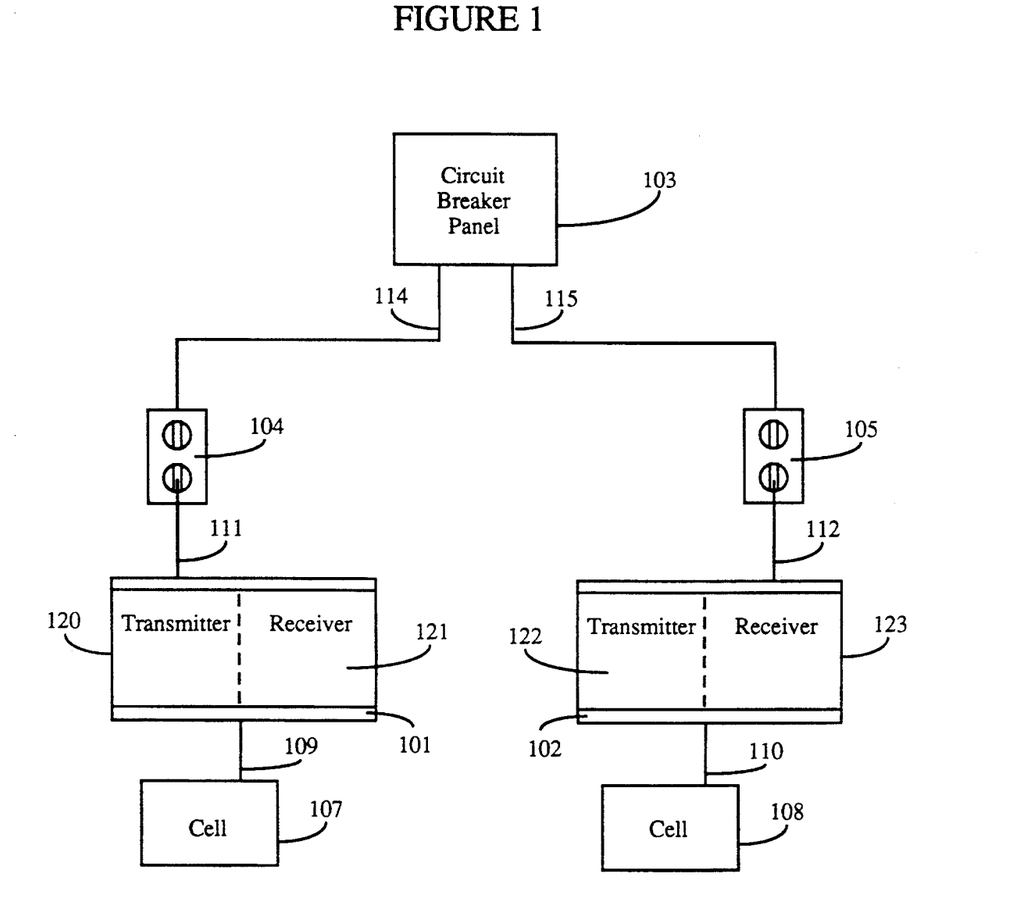
FIG. 1 is an illustration of a typical application of the power line communication system of the present invention.

Referring to FIG. 1, a typical application of the power line communication system of the present invention is shown. A power distribution network such as the simplified network shown in FIG. 1 is typical of those present in most industrial, business and residential structures. In general, such systems include a circuit breaker panel 103 to which a plurality of power lines 114 and 115 are coupled. Typical electrical outlets 104 and 105 may also be connected to power lines 114 and 115. This power distribution network is typically used to distribute 50 or 60 Hz AC power, although in some cases higher frequencies are used such 400 Hz in aircraft or lower frequencies such as 25 Hz in some rail systems. Many different types of electric devices may be coupled to a power distribution network such as the one shown in FIG. 1.

The power distribution network may be used as communications medium as well as a power distribution means. Thus, data may be transferred from one location on the power distribution network to another location via lines 114 and/or 115. In order to provide the data communications capability, the present invention includes a transmitter/receiver (i.e. transceiver) 101 and 102. Transceiver 101 is shown coupled to outlet 104 via line 111 and transceiver 102 is shown coupled to outlet 105 via line 112. Thus, data may be transferred from transceiver 101 across lines 111 and 114 through circuit panel 103 and to transceiver 102 via lines 115 and 112. Transceiver 101 and 102 may also be coupled with a cell 107 and 108 such as the apparatus described in U.S. Pat. No. 4,944,143 or other device. The cell or other device 107 may be coupled to transceiver 101 in order to supply data for transmission across the power distribution network. Similarly, a cell or other device 108 may be coupled to a transceiver 102 in order to receive the data transmitted by transmitter 101. It will be apparent to those skilled in the art that a cell does not necessarily need to be used as a data source or a data sink. Other types of sources for digital data may be coupled to transceivers 101 and 102. Similarly, a processor may be included within transceivers 101 and 102. In addition, it will be apparent to those skilled in the art that transceiver 101 does not necessarily need to be coupled to an outlet receptacle 104 such as that illustrated in FIG. 1. For example, transceiver 101 may be embedded within receptacle 104 in order to transmit and/or receive data via power line 114. It should also be noted that transceiver 101 is identical in structure to transceiver 102 as shown in FIG. 1. The internal architecture and function of the transmitter section and the receiver section of transceiver 101 will be described in more detail below.

Figure 2:
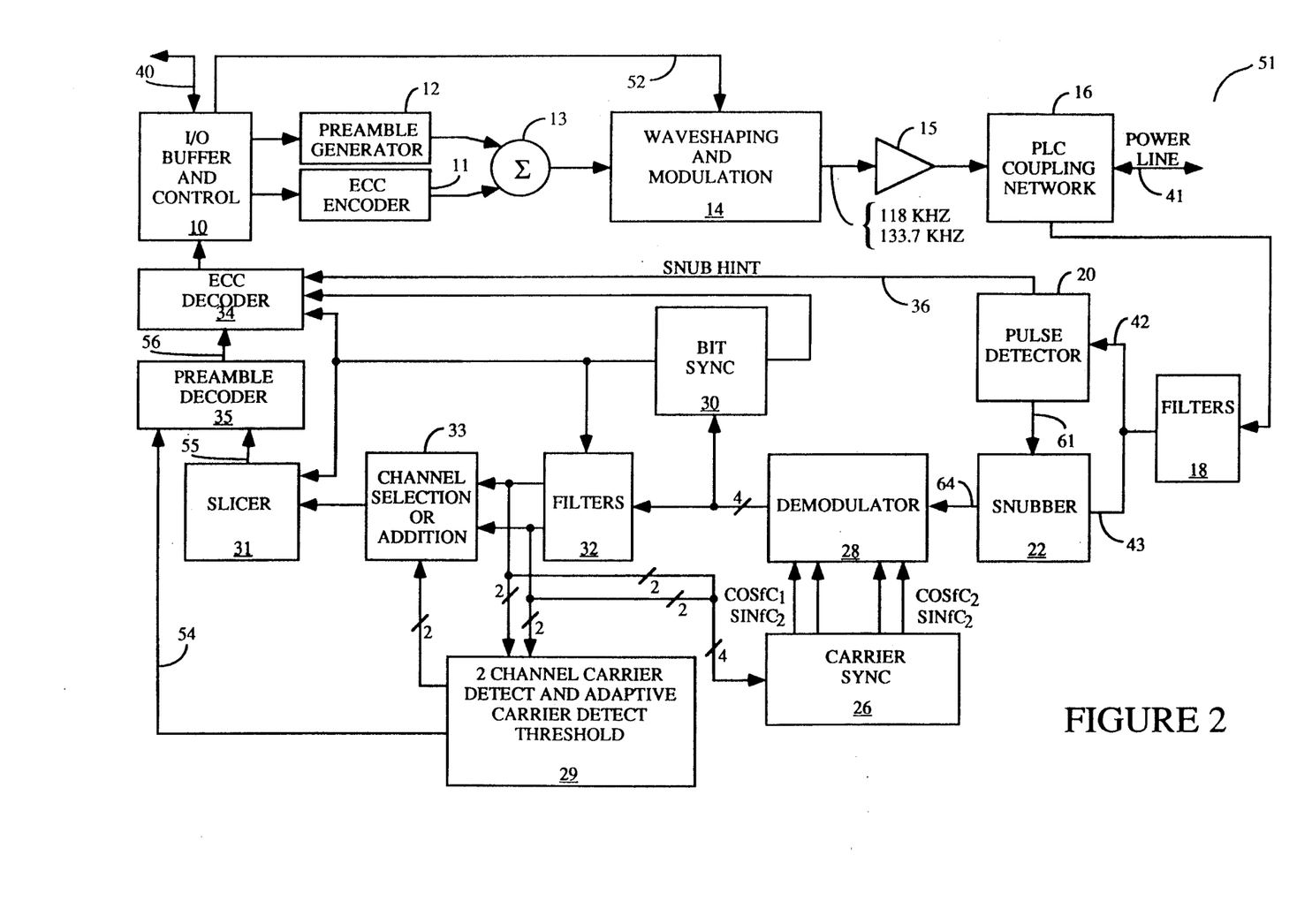
FIG. 2 is a block diagram of the transceiver of the present invention.

There are numerous sources of noise and other transients associated with power line distribution systems that make it difficult to receive and/or reconstruct signals from a PLC transmitter. For instance, television sets have been found to produce a substantial degree of noise on the power line distribution network. Other sources of noise include light dimmers, intercoms, electric motors, and numerous other types of electronic or electric devices. Consequently, the receiver 123 acting in concert with transmitter 120 must be able to isolate valid data from the noise on the power line distribution network.

Overall Block Diagram of the Preferred Embodiment

Referring now to FIG. 2, a block diagram of the circuitry within transceiver 101 and 102 is depicted. While in the above discussion, a separate transmitter and receiver are discussed, typically the transmit and receive functions are combined into a single device as shown in FIG. 2. The upper portion of the block diagram in FIG. 2 corresponds to the transmit section of the PLC apparatus of the present invention while the lower portion of FIG. 2 is the receive section. This latter section receives signals over the power line 41, processes them, then couples the resultant digital signal to the I/O buffer and control circuit 10. From there, the signals are coupled over lines 40 to a cell or other device. The lines 40 may communicate with a cell such as the apparatus described in U.S. Pat. No. 4,944,143. The input/output buffer and control circuit 10 provides ordinary coupling between the cell or other device and the PLC apparatus of the present invention.

The data received over lines 40 is coupled to an error correcting code (ECC) encoder 11. The data is encoded, in the currently preferred embodiment, with a Hamming code. Data is transmitted from the cell onto the power line in packets with the preamble generator 12 providing a preamble for each of the packets. At summer 13, the preamble is positioned in front of the packets of encoded data from the encoder 11. Consequently, the summer 13 performs a multiplexing function in that it selects either the data or preamble. Details of the preamble generator 12 of the currently preferred embodiment are described below.

The output of the summer 13 is coupled to a waveshaping and modulating circuit 14. In the currently preferred embodiment, this circuit includes a read-only-memory, a digital-to-analog converter and two filters. (The filters in the integrated circuit embodiment of the present invention are switched capacitor filters.) Detailed aspects of the waveshaping and modulation circuit 14 are described in co-pending patent application Ser. No. 07/698,676, filed May 10, 1991, assigned to the Assignee of the present invention. Other circuits for performing these functions are well-known in the prior art.

With the invented apparatus, the data is transmitted in its entirety on two channels, that is, there is redundancy in the transmission. All the data (including the preamble) modulates both a 118 kHz carrier and a 133.7 kHz carrier for PLC devices designed for use in the United States. (Other carrier frequencies are used for other countries to comply with different regulations.) The selection of these frequencies, and more particularly, the separation between the frequencies is described in co-pending application Ser. No. 07/628,676 filed May 10, 1991, assigned to the Assignee of the present invention.

Quadrature phase shift keying (QPSK) is used to modulate the carriers under most operations. However, BPSK (Binary Phase Shift Keying) is also used. In parts of the following description, emphasis is sometimes placed on the QPSK. It will be apparent to one skilled in the art that the invention can also be used with BPSK or other modulation techniques.

The output of the waveshaping and modulation circuit 14 is coupled to an amplifier 15 and from there to the power line 41 through a power line coupling network 16. In the preferred embodiment, a portion of amplifier 15 and the entire network 16 are fabricated from discrete components even in the case where an integrated circuit is used to realize the PLC apparatus. (A portion of amplifier 15 and network 16 are external components to the integrated circuit.) The amplifier 15 and network 16 are described in co-pending application Ser. No. 07/678,525, filed May 10, 1991 and assigned to the Assignee of the present invention.

Signals received on the power line 41 are coupled through the network 16 to the filters 18. Filters 18 again comprise switched capacitor filters for the integrated circuit embodiment. The filters 18 comprise a high pass filter and a low pass filter. The high pass filter has a cut-off frequency of approximately 100 KHz, and the low pass filter, a cut-off frequency of approximately 320 KHz. The filters 18 thus pass the modulated carriers and additionally the filters 18 pass certain noise. The pulse detector 20 receives the output of the filters 18 (line 42). The detector 20 detects anomalies in the waveform such as noise pulses or other excursions of the waveform above or below certain threshold levels. For example, the pulse detector 20 detects noise associated with electronically-controlled light dimmers and other sources of high frequency pulses. The pulse detector 20 provides a snubber control signal to a snubber 22. The snubber 22 blanks or snubs the signals from filters 18 for predetermined periods when a pulse representing a disturbance (noise pulse) is present in the received signal.

The pulse detector 20 and snubber 22 are described in co-pending applications Ser. Nos. 07/698,602 and 07/698,600 both filed May 10, 1991 assigned to the Assignee of the present invention. Note, as mentioned above, two carriers are used and hence two channels are needed; one for the 118 KHz signal and the other for the 133.7 KHz signal.

A carrier synchronization circuit 26 provides local oscillator signals both for in phase and quadrature phase to the demodulator 28. Hence, four signals are coupled from the carrier synchronization circuit 26 to the demodulator 28 (two for each channel). (Four signals are provided even for BPSK; the quadrature signals do not contain data, however.) The demodulator 28, under control of the output of carrier synchronization circuit 26, demodulates the two carrier signals and provides both an in-phase and quadrature phase demodulated signal for each of the two channels to the filters 32. The output of the demodulator 28 is also coupled to a bit (baud) synchronization circuit 30. This circuit provides baud synchronization to the decoder 34 as well as other circuits. The demodulator 28 and bit synchronization circuit 30 are ordinary, well-known circuits except as discussed herein.

The filters 32 comprise four matched filters, two for each channel. Certain details of these filters are described in co-pending application Ser. No. 07/698,676, filed May 10, 1991, assigned to the Assignee of the present invention.

A two channel carrier detect and adaptive carrier detect threshold circuit 29 is coupled to the output of filters 32. Output signals from circuit 29 are provided to channel selection or addition circuit 33 and a preamble decoder 35 that decodes the preamble of a data packet and determines word sync for the packet. A carrier detect signal on line 54 is used for synchronizing the decoding of the preamble. The preamble decoder 35 is described below. The output of the filters 32 is coupled to the channel selection or addition circuit 33. This circuit also receives two threshold level signals, one for each channel from the circuit 29. Within the channel selector 33, the data from one channel or the other is selected or the data in both channels is added together. (Note: the same data is present in both channels.) In summary, if the noise in one channel is high, relative to noise in the other channel, the channel with the lesser noise is selected. If the noise is both channels is approximately equal, the signals in the channels are added.

The output from circuit 33 is coupled to the slicer 31 where the waveform is converted to a digital form in an ordinary manner under control of the bit synchronization signal. The slicer 31 provides the binary 1 or 0 levels by detecting the signal level at a given time step.

The signal from slicer 31 is coupled to the preamble decoder 35 which is coupled to the ECC decoder 34. Here, it is determined whether an error occurred in the transmission and if so, it is corrected with a Hamming code. Additionally, a parity bit is transmitted with each word enabling the detection of a second error in each byte. The decoded data is coupled from the decoder 34 to the input/output buffer and control 10 and from there to the cell or other device over lines 40.

While in the following description analog signals are sometimes discussed since they are used in the currently preferred embodiment, the present invention may be realized using digital signal processing (DSP) techniques. For instance, the signal path from the input to filters 18 through the slicer 31 can be fabricated with DSP techniques.

Preamble and Word Sync Circuitry and its Operation

Referring still to FIG. 2, preamble generator 12 creates a header (i.e. preamble) for each packet of data transmitted by transceiver 51. The packet preamble generated by preamble generator 12 consists of a carrier detect interval, a carrier sync interval, a bit sync interval, and a word sync pattern. The carrier detect interval of the preamble is used by carrier detector 29 on the receive side of the transceiver 51 to identify the beginning of a data packet. Information identifying the beginning of a data packet (i.e. carrier detect) is also conveyed to preamble decoder 35 on line 54. Two carriers are detected by carrier detector 29; one carrier is a 118 KHz signal and the other is a 133.7 kHz signal. The carrier sync interval of the preamble is used by carrier synchronization circuit 26 to identify the phase of the incoming transmission and adjust the four signals out of carrier sync circuit 26. These four signals are adjusted into a proper phase relation with the incoming signal such that quadrature demodulation of both carriers is possible. Hence, four signals are coupled from the carrier synchronization circuit 26 to the demodulator 28 (two for each channel). Four signals are provided even for BPSK; in BPSK mode, however the quadrature signals out of demodulator 28 do not contain data. The bit sync section of the preamble is used by bit (baud) synchronization circuit 30 to indicate the positions of baud symbols within the packet. Bit (baud) synchronization circuit 30 is coupled to the output of the demodulator 28. The demodulator 28, under control of the output of carrier synchronization circuit 26, demodulates the two carrier signals and provides both an in-phase and quadrature phase signal for each of the two channels to the filters 32. The word sync pattern in the preamble is used by the preamble decoder 35 to identify the beginning of a baud grouping, called a forward error correcting word (i.e. FEC word). Information identifying the beginning of a data packet (i.e. carrier detect) is received by preamble decoder 35 from carrier detector 29. The remainder of the data packet is transmitted and received as a collection of FEC words. The demodulator 28 and bit synchronization circuit 30 are ordinary, well-known circuits except as discussed herein. The encoding of a transmission mode in the word sync pattern of the preamble is described next.

The transceiver 51 may select either QPSK or BPSK transmission modes on a data packet by data packet basis by encoding information into the packet preamble. The transceiver 51 always begins transmitting each packet in the BPSK mode. At a fixed position in the preamble of every packet, after carrier synchronization (if used) and after bit synchronization are complete, the transmitter of transceiver 51 sends a fixed code (i.e. a transmission mode) indicating to the receiver whether the remainder of the packet will be decoded as BPSK or QPSK data. After decoding the transmission mode in the preamble, the receiver switches to BPSK or QPSK mode accordingly.

In the present invention, the transmission mode information is encoded into the word sync pattern itself in a way which consumes fewer bits than if word sync and transmission mode were coded separately. If a transmission mode is transmitted separately from the word sync pattern, a transmission mode requires at least three transmitted bits to encode one bit of mode information, assuming that at least single bit error detection is implemented.

The word sync pattern is used in the present invention by shifting the incoming preamble data bits one bit position at a time and then comparing the incoming bits with the word sync pattern. After each shift, the Hamming distance between the received bit string and the word sync pattern is computed. Hamming computation is a technique well known in the art. When a Hamming distance of one or less is found, the correct word sync position has been found. The word sync detection circuit in the preferred embodiment is included in the preamble decoder circuit 35 and described below in conjunction with FIG. 3. The method for determining the best word sync pattern is described next along wtih FIGS. 4 and 5.

The selection of an appropriate word sync pattern is critical to the proper detection the word sync position of the incoming bits regardless of misalignment of the bits and also in the face of single bit errors. In order to properly detect word sync and maintain single bit error immunity, a word sync pattern must be determined such that any offset from the correct input bit string produces a Hamming distance of at least three. With such an approach, any wrong position (i.e. misalignment) of the incoming data, even with a single bit error, will result in a Hamming distance of at least two, and thus will fail to sync. The correct position, with one or fewer mismatches, will always sync properly.

Figure 4:
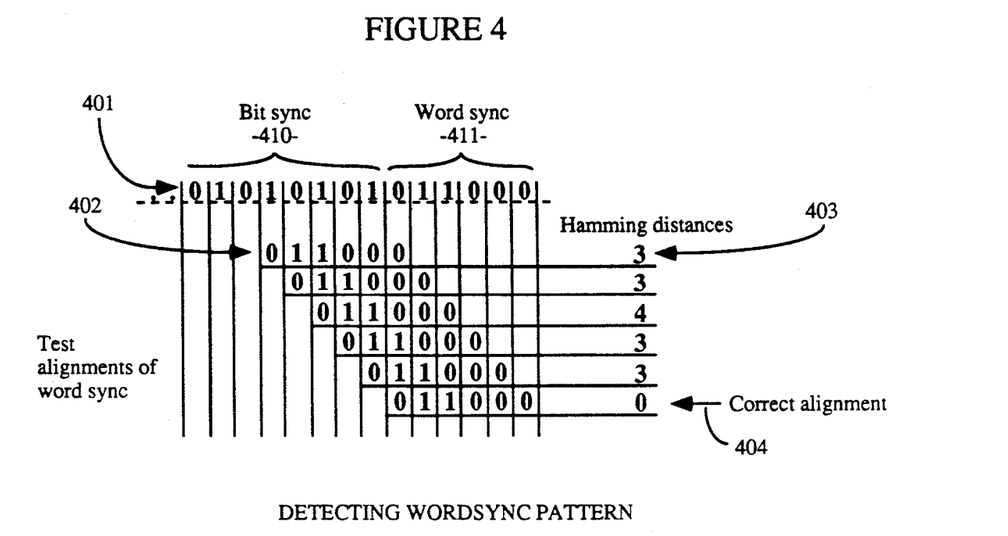
FIG. 4 is an illustration of the Hamming calculations during word sync pattern detection.

For an example of the Hamming computation, refer to FIG. 4. Given that the transmitted bit sync pattern ends in the binary string 01010101, there are at least two word sync patterns of six bits each, 011000 and 110010, that satisfy the above criteria for maintaining a Hamming distance of three or greater. No five bit patterns satisfy all criteria. FIG. 4 illustrates an example of the use of the word sync pattern 011000. A similar example can be produced for the word sync pattern 110010. Note that in all but the correct alignment of the incoming data, the Hamming distance is three (3) or greater. Thus, even for a single bit error, either of the above two word sync patterns can be used to properly detect word sync in all situations.

The existence of two 6-bit word sync patterns suggests that an additional bit of signalling information can be coded into the word sync section of the data preamble. By transmitting either word sync pattern 011000 or 110010, and by implementing a receiver having Hamming distance checking logic for both patterns, the transmitter could effectively indicate both the word sync position plus an additional bit of information in a total of only six bits.

Figure 5:
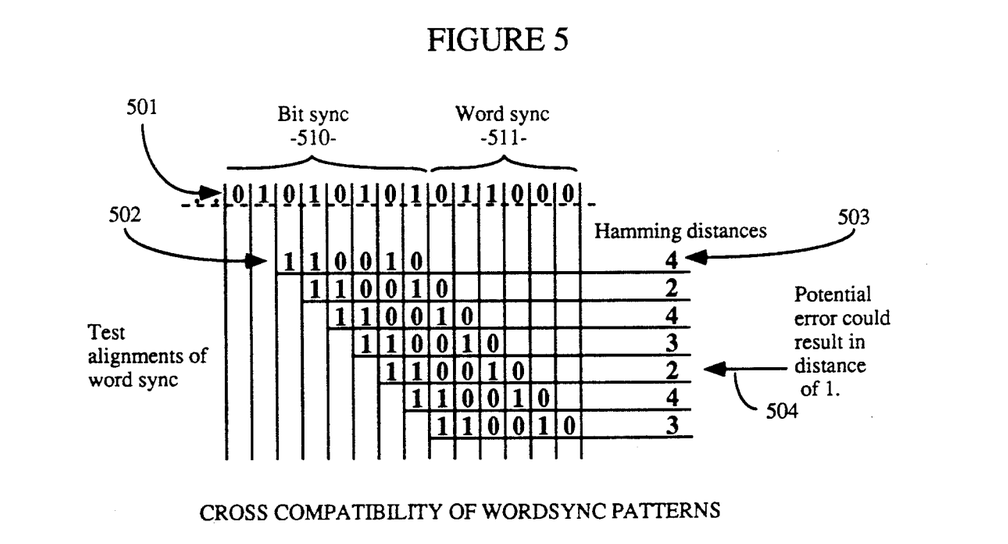
FIG. 5 is an illustration of the cross-compatibility problem with six bit word sync patterns.

Unfortunately, the two six-bit word sync patterns (011000 and 110010) are not cross compatible. If a matching circuit is constructed to detect the pattern 011000, and the transmitter sends the pattern 110010, there is an alignment which generates a Hamming distance of less than three in violation of the necessary criteria. This case is illustrated in FIG. 5. FIG. 5 shows a receiver searching for a match with word sync pattern 110010, while the transmitter has actually sent word sync pattern 011000. In the fifth Hamming computation (identified by an arrow), a Hamming distance of two is generated. If a single bit error were to occur, a Hamming distance of one could be produced and an erroneous word sync match would result.

Figure 6A:
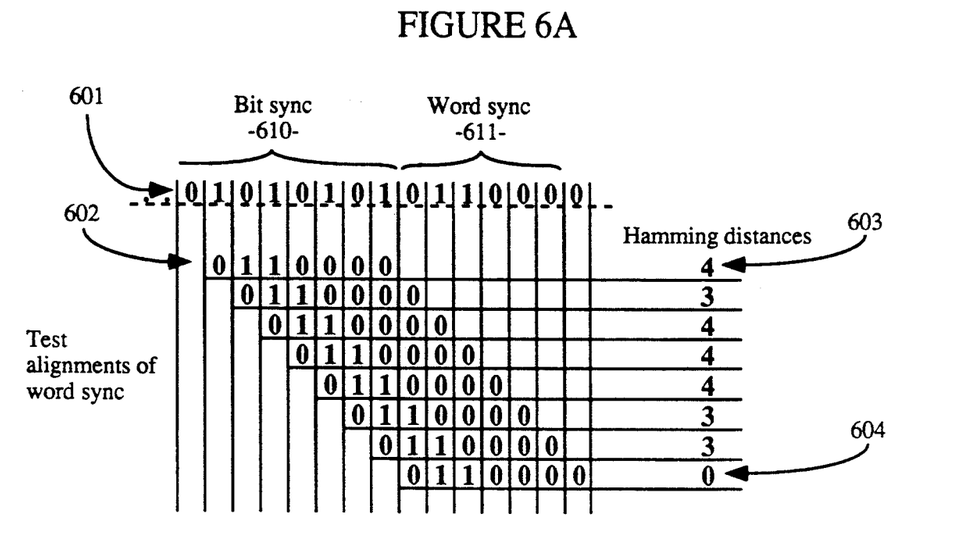
FIGS. 6a–6d illustrate the use of two seven bit word sync patterns and the cross-compatibility between the two patterns.
Figure 6B:
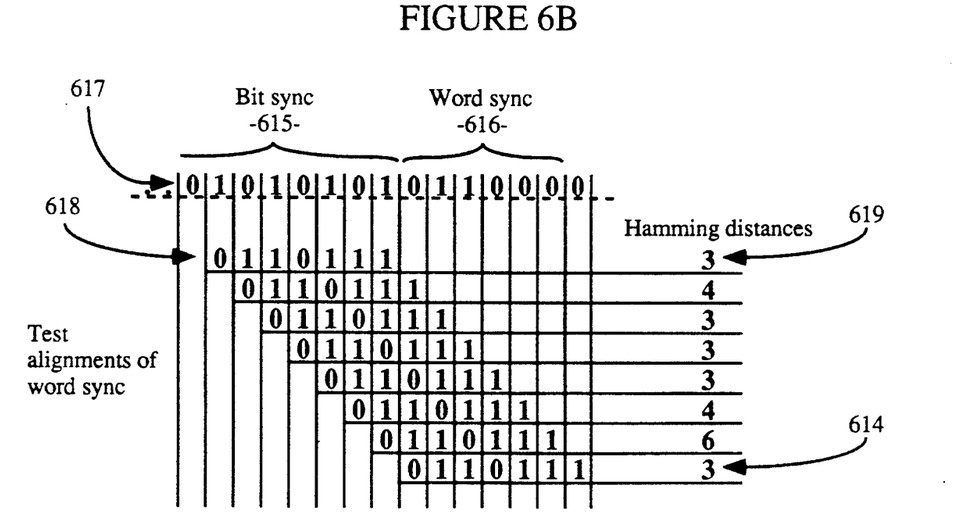
Figure 6C:
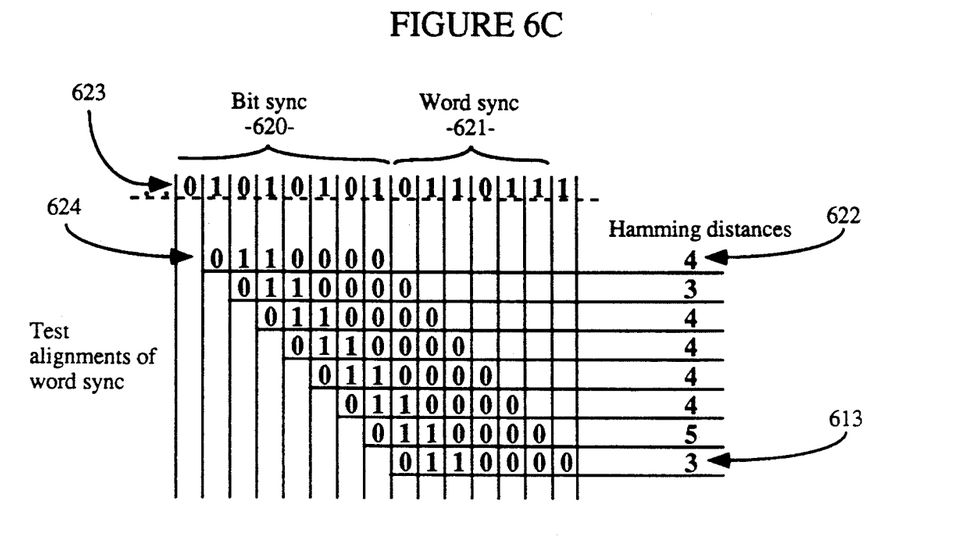
Figure 6D:
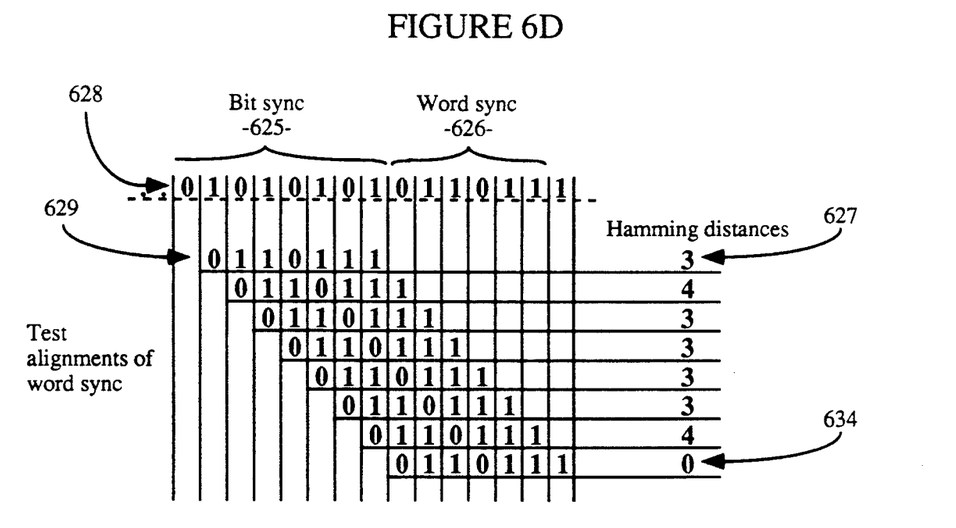

In order to eliminate the cross compatibility problem with a six-bit word sync pattern as described above, a seven-bit word sync pattern is used in the present invention. With a seven-bit word sync pattern, there exists a pair of cross-compatible word sync patterns such that at any cross alignment configuration, a Hamming distance of three or greater is always maintained. The appropriate pair of seven-bit word sync patterns is 0110000 and 0110111. These word sync patterns provide valid word sync detection capability while supporting single bit error detection. Referring to FIGS. 6a–6d, the cross-compatibility of the two seven-bit word sync patterns is demonstrated. In FIG. 6a, the word sync 611 pattern 0110000 in line 601 is tested against itself in line 602. As evident in the column labeled "Hamming distances," the required Hamming distance of three or more is maintained for each alignment until line 604 where the proper alignment is detected. In FIG. 6b, the word sync 616 pattern 0110000 in line 617 is tested against the alternate seven-bit word sync pattern of 0110111 in line 618. This time, the required Hamming distance of three or more is maintained for all alignments of the two patterns. The converse case is illustrated in FIG. 6c. In this case, word sync 621 pattern 0110111 in line 623 is tested against the alternate seven-bit word sync pattern of 0110000 in line 624. Again, no erroneous match is generated. In FIG. 6d, the word sync 626 pattern 0110111 in line 628 is tested against itself in line 629 and the proper match is detected in line 634. Thus, one pattern of the pair of seven-bit word sync patterns does not cause an erroneous match with the alternate pattern.

Since two seven-bit cross compatible word sync patterns exist, a convenient means for signalling the transmission mode for each data packet becomes available. Thus, one word sync pattern is used to define a BPSK transmission while the other word sync pattern is used to define a QPSK transmission. The appropriate word sync pattern (associated with either BPSK or QPSK) is generated for each data packet by the preamble generator 12 as shown in FIG. 2. The transmitter may send data packets using either BPSK or QPSK on a packet by packet basis by generating the appropriate word sync pattern for each packet. The receiver uses the word sync pattern to determine the receive mode for each packet.

Referring again to FIG. 2, the receiver portion of transceiver 51 includes a preamble decoder circuit 35 for receiving and decoding the word sync pattern generated for a particular data packet by preamble generator 12. As illustrated in FIG. 2, the preamble decoder 35 receives a carrier detect signal 54 from carrier detector 29. Carrier detect signal 54 is used by the preamble decoder 35 to determine the start of a data packet. The preamble decoder 35 receives input preamble data and a clock signal from slicer 31.

Figure 3:
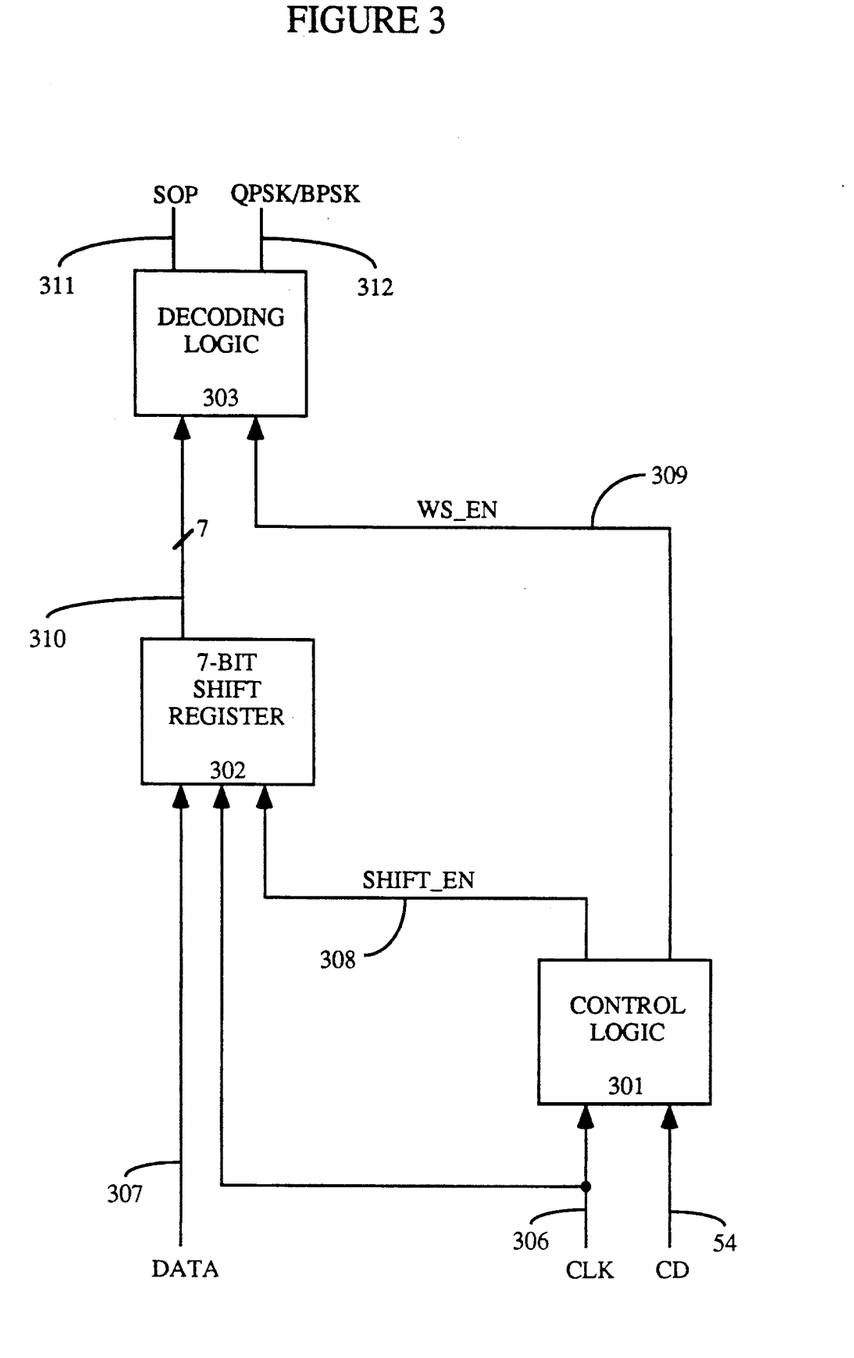
FIG. 3 is an illustration of the preamble detect and word sync circuitry of the present invention.

Referring now to FIG. 3, the word sync detection logic within the preamble decoder 35 is illustrated in detail. A control logic circuit 301 receives the carrier detect signal 54 from carrier detector 29 and a clock signal 306 from slicer 31. When the carrier detect signal 54 becomes active, control logic circuit 301 enables the shift enable signal 308 to shift register 302. With an active shift enable signal 308 and a valid clock 306, seven bits of incoming preamble data 307 can be shifted into shift register 302. Once seven bits of incoming preamble data 307 have been shifted into shift register 302, a word sync enable signal 309 is asserted and received by decoding logic 303. Decoding logic 303 also receives the seven bits shifted into shift register 302. Decoding logic 303 then compares the seven input preamble bits from the shift register 302 with each of the two seven-bit word sync patterns described above and stored in decoding logic 303. As described above, a first word sync pattern corresponds to a BPSK transmission mode; a second word sync pattern corresponds to a QPSK transmission mode. If decoding logic 303 matches the input seven preamble bits with one of the seven-bit word sync patterns or if only a single bit error is different (i.e. a Hamming difference of 1), decoding logic declares a valid word sync by asserting a start of packet signal 311. The signal 312 is then set to indicate a QPSK or BPSK transmission mode depending upon which of the two word sync patterns matched the input preamble data. The bit slicer 31, carrier synchronization circuit 26, and ECC decoder 34 then use the setting of signal 312 to switch reception into BPSK or QPSK mode. The transmission mode and start of packet signals are provided to ECC decoder 34 via signal line 56. ECC decoder 34 is then able to properly decode the incoming data packet based on the signals from the preamble decoder 35.

Thus, a power line communication (PLC) apparatus wherein transmission mode information is encoded into each data packet while maintaining immunity from single bit errors is described.

Although this invention has been shown in relation to a particular embodiment, it should not be considered so limited. Rather, it is limited only by the appended claims.

What is claimed is:

1. In a data communication system having means for receiving data from a data source and means for transmitting data on a data communication medium, a preamble generator for generating a preamble for transmission with said data, said preamble generator comprising:
   means for encoding data word synchronization information into said preamble;
   means for encoding error detection information into said preamble, said means for encoding error detection information providing at least single bit error detection, said preamble with said data word synchronization information and said error detection information having a length of n binary digits; and
   means for encoding transmission mode information into said preamble, said preamble with said data word synchronization information, said error detection information, and said transmission mode information having a length of n+1 binary digits.

2. The preamble generator as claimed in claim 1 wherein said preamble with said data word synchronization information, said error detection information, and said transmission mode information has a length of seven binary digits.

3. The preamble generator as claimed in claim 1 wherein said transmission mode information specifies a BPSK or a QPSK transmission mode.

4. The preamble generator as claimed in claim 1 wherein said transmission mode information is encoded using one of two predetermined data word synchronization patterns.

5. The preamble generator as claimed in claim 1 wherein said transmission mode information is encoded on a data packet by data packet basis.

6. The preamble generator as claimed in claim 1 wherein said preamble includes a seven bit data word synchronization pattern with the binary value of 0110000.

7. The preamble generator as claimed in claim 1 wherein said preamble includes a seven bit data word synchronization pattern with the binary value of 0110111.

8. In a data communication system having means for receiving data from a data source and means for transmitting data on a data communication medium, a preamble decoder for interpreting preamble information received with said data, said preamble decoder comprising:
   means for receiving a preamble, said preamble having encoded data word synchronization information, error detection information, and transmission mode information, said error detection information providing at least single bit error detection, said preamble with said data word synchronization information and said error detection information having a length of n binary digits, said preamble with said data word synchronization information, said error detection information, and said transmission mode information having a length of n+1 binary digits;
   means for decoding said transmission mode information; and
   means for switching to a receive mode specified by said transmission mode information decoded by said means for decoding.

9. The preamble decoder as claimed in claim 8 wherein said means for decoding further includes means for computing a Hamming distance between said preamble received by said means for receiving and a predetermined data word synchronization pattern.

10. The preamble decoder as claimed in claim 8 wherein said means for switching further including means for selecting a BPSK or a QPSK receiving mode depending upon the mode decoded by said means for decoding.

11. In a data communication system having means for receiving data from a data source and means for transmitting data on a data communication medium, a process for generating a preamble for transmission with said data, said process comprising the steps of:
   encoding data word synchronization information into said preamble;
   encoding error detection information into said preamble, said step of encoding error detection information providing at least single bit error detection, said preamble with said data word synchronization information and said error detection information having a length of n binary digits; and
   encoding transmission mode information into said preamble, said preamble with said data word synchronization information, said error detection information, and said transmission mode information having a length of n+1 binary digits.

12. The process as claimed in claim 11 wherein said preamble with said data word synchronization information, said error detection information, and said transmission mode information has a length of seven binary digits.

13. The process as claimed in claim 11 wherein said transmission mode information specifies a BPSK or a QPSK transmission mode.

14. The process as claimed in claim 11 wherein said transmission mode information is encoded using one of two predetermined data word synchronization patterns.

15. The process as claimed in claim 11 wherein said transmission mode information is encoded on a data packet by data packet basis.

16. The process as claimed in claim 11 wherein said preamble includes a seven bit data word synchronization pattern with the binary value of 0110000.

17. The process as claimed in claim 11 wherein said preamble includes a seven bit data word synchronization pattern with the binary value of 0110111.

18. In a data communication system having means for receiving data from a data source and means for transmitting data on a data communication medium, a process for interpreting preamble information received with said data, said process comprising the steps of:
   receiving a preamble, said preamble having encoded data word synchronization information, error detection information, and transmission mode information, said error detection information providing at least single bit error detection, said preamble with said data word synchronization information and said error detection information having a length of n binary digits, said preamble with said data word synchronization information, said error detection information, and said transmission mode information having a length of n+1 binary digits; decoding said transmission mode information; and switching to a receive mode specified by said transmission mode information decoded in said decoding step.

19. The process as claimed in claim 18 wherein said step of decoding further including computing a Hamming distance between said preamble received in said receiving step and a predetermined data word synchronization pattern.

20. The process as claimed in claim 18 wherein said step of switching further including selecting a BPSK or a QPSK receiving mode depending upon the mode decoded in said decoding step.

* * * * *

UNITED STATES PATENT AND TRADEMARK OFFICE
CERTIFICATE OF CORRECTION

| | | |
|---|---|---|
| PATENT NO. | : | 5,289,476 |
| DATED | : | February 22, 1994 |
| INVENTOR(S) | : | Johnson et al. |

It is certified that error appears in the above-identified patent and that said Letters Patent is hereby corrected as shown below:

In column 8 at line 63 delete "wtih" and insert --with--

Signed and Sealed this

Eighth Day of December, 1998

Attest:

BRUCE LEHMAN

*Attesting Officer*    *Commissioner of Patents and Trademarks*